(12) United States Patent
Lundh et al.

(10) Patent No.: US 9,995,306 B2
(45) Date of Patent: Jun. 12, 2018

(54) METHOD AND SYSTEM FOR FLUID FLOW CONTROL IN A FLUID NETWORK SYSTEM

(71) Applicant: ABB Research Ltd., Zurich (CH)

(72) Inventors: Michael Lundh, Vasteras (SE); Jan Nyqvist, Vasteras (SE)

(73) Assignee: ABB Research Ltd., Zurich (CH)

( * ) Notice: Subject to any disclaimer, the term of this patent is extended or adjusted under 35 U.S.C. 154(b) by 216 days.

(21) Appl. No.: 14/653,176

(22) PCT Filed: Dec. 11, 2013

(86) PCT No.: PCT/EP2013/076162
§ 371 (c)(1),
(2) Date: Jun. 17, 2015

(87) PCT Pub. No.: WO2014/095504
PCT Pub. Date: Jun. 26, 2014

(65) Prior Publication Data
US 2015/0337849 A1    Nov. 26, 2015

(30) Foreign Application Priority Data

Dec. 20, 2012  (EP) .................................... 12198780

(51) Int. Cl.
*F04D 27/00*  (2006.01)
*G05B 15/02*  (2006.01)
(Continued)

(52) U.S. Cl.
CPC .............. *F04D 27/00* (2013.01); *E21F 1/02* (2013.01); *G05B 15/02* (2013.01); *G05D 7/0682* (2013.01)

(58) Field of Classification Search
CPC ............................... E21F 1/02; G05D 7/0682
(Continued)

(56) References Cited

U.S. PATENT DOCUMENTS 5,269,660 A * 12/1993 Pradelle .................... E21F 1/00
417/18
2010/0105308 A1* 4/2010 Masse ........................ E21F 1/00
454/168
(Continued)

FOREIGN PATENT DOCUMENTS

CN       1676878 A     10/2005
CN     101842553 A      9/2010
(Continued)

OTHER PUBLICATIONS

International Search Report and Written Opinion of the International Searching Authority Application No. PCT/EP2013/076162 Completed: Jan. 10, 2014; dated Jan. 17, 2014 12 pages.
(Continued)

*Primary Examiner* — Emilio J Saavedra
(74) *Attorney, Agent, or Firm* — Whitmyer IP Group LLC

(57) ABSTRACT

A method of controlling fluid flow in a fluid network system by fluid machines includes obtaining a respective current flow rate associated with each fluid machine, obtaining a current fluid machine speed of each fluid machine, obtaining desired flow rates in the system, and determining a new fluid machine speed for each fluid machine based on the current fluid machine speed and a change in the fluid machine speed required to obtain the desired flow rates. The change in fluid machine speed is determined by minimizing a total fluid machine power which is a function dependent of the change in the fluid machine speed, the minimization being performed with constraints for flow rate, fluid machine pressure and fluid machine speed. The method include controlling the speed of the fluid machines according to the new fluid machine speeds such that the minimum total fluid machine power in the system is attained.

13 Claims, 3 Drawing Sheets

(51) Int. Cl.
  *G05D 7/06* (2006.01)
  *E21F 1/02* (2006.01)
(58) Field of Classification Search
  USPC .......................................................... 700/282
  See application file for complete search history.

(56) References Cited

U.S. PATENT DOCUMENTS

2012/0101648 A1* 4/2012 Federspiel ......... G05D 23/1934
                                                        700/291
2012/0316914 A1  12/2012 Lee et al.

FOREIGN PATENT DOCUMENTS

| CN | 102287213 A | 12/2011 | |
| CN | 102388350 A | 3/2012 | |
| WO | 2009027815 A2 | 3/2009 | |
| WO | WO 2012025122 A1 * | 3/2012 | .......... F24F 11/0001 |
| WO | 2012097437 A1 | 7/2012 | |
| WO | 2012171571 A1 | 12/2012 | |

OTHER PUBLICATIONS

Andersen, M. Bartch, E. and Laine, M. 2010. The Application and Implementation of Optimized Mine Ventilation on Demand (OMVOD) at the Xstrata Nickel Rim South Mine, Sudbury, Ontario. In: Mirarco, Laurentian University.

Vost, K. R. 1971 "In situ" measurements of the surface heat transfer coefficient in underground airways, Journal of the South African Institute of Mining and Metallurgy. [online] Available at: <www.saimm.co.za/Journal/v073n08p269.pdf>[Accessed Mar. 21, 2011].

BesTech, 2011. Air Quality Monitoring System [website] Available at <bestech.com/en_aqm.html>[Accessed Jun. 1, 2011].

European Search Report Application No. EP 12 19 8780 Completed: May 6, 2013; dated May 14, 2013 7 pages.

Bruce, W. 1986. Natural Draft: Its Measurement and Modelling in Underground Mine Ventilation Systems. Washington, D.C: U.S. Department. of Labour, Mine Safety and Health Administration.

Mining Technology. 2011. TauTona, Anglo Gold, South Africa [website] Available at <www.mining-technology.com/projects/tautona_goldmine/>[Accessed May 5, 2011].

SimSmart, 2011. Optimized Mine Ventilation On Demand (OMVOD). [website] Available at: <simsmart.com/index_files/OMVOD.htm>[Accessed Jun. 10, 2011].

Prosser, B and Wallace, K. (1999) Practical Values of Friction Factors In: University of Missouri. 8th US Mine Ventilation Symposium Jun. 14-16, 1999. Rolla, Missouri.

Baldauf, et al. n.d. Regulated and Air Toxic Exhaust Emissions from Nonroad Diesel Engines and Equipment. US Environmental Protection Agency. [online] Available at: <www.epa.gov/ttn/chief/conference/ei13/mobile/helmer.pdf>[Accessed May 20, 2011].

McPhearson, n.d. Subsurface Ventilation Engineering. [online] Mine Ventilation Services. Available at: <www.mvsengineering.com/index.cfm?fuseaction=menu4&menu_id=5004 >[Accessed Jun. 6, 2011].

Allen, C. and Tonnus, A.M. 2008. Technology convergence for sustainable underground mine ventilation system control. In: University of Nevada. 12th U.S./North American Mine Ventilation Symposium 2008. Reno, USA. Jun. 9-11, 2008.

Chinese Office Action Application No. 201380067205.5 Completed Date: Jan. 12, 2017; dated Feb. 4, 2017 5 Pages.

English Translation of Chinese Office Action Application No. 201380067205.5 Completed Date: Jan. 12, 2017; dated Feb. 4, 2017 7 Pages.

* cited by examiner

METHOD AND SYSTEM FOR FLUID FLOW CONTROL IN A FLUID NETWORK SYSTEM

TECHNICAL FIELD

The present disclosure relates to fluid network systems and in particular to fluid flow control in such systems.

BACKGROUND

Large fluid network systems can in some applications consume substantial amounts of energy. An example of such a fluid network system is a ventilation system of an underground mine. Such a ventilation system can comprise a plurality of fans which need to be operated in order to maintain sufficient air quality for healthy working conditions in the mine.

Ventilation on demand (VOD) control is sometimes utilized today to reduce the amount of consumed energy in underground mines. In short VOD means that fresh air is directed to specific locations in the underground mine only when needed and at sufficient amount to achieve a healthy working environment. Attempts to use network models, i.e. models that describe fluid dynamical characteristics of the underground mine network, have been done but these suffer from sensitivity for changes in the infrastructure of the mine, and require a substantial engineering effort to be commissioned.

WO2009/027815 discloses a mine ventilation system which establishes a dynamic ventilation demand as a function of real-time tracking of machinery and/or personnel location and where this demand is distributed in the work zones via the mine ventilation network and where the energy required to ventilate is minimized while satisfying the demand for each work zones. The mine ventilation system operates on the basis of a predictive dynamic simulation model of the mine ventilation network along with emulated control equipment such as fans and air flow regulators.

However, the determining of the dynamic simulation model of the mine is a complicated process which must be repeated every time the infrastructure of the underground mine is modified.

SUMMARY

A general object of the present disclosure is to minimize the electric power consumption of a fluid network system while being able to provide sufficient fluid flow.

In view of the above, in a first aspect of the present disclosure there is provided a method of controlling fluid flow in a fluid network system by means of a plurality of fluid machines, wherein the method comprises:
 a) obtaining a respective current fluid flow rate associated with each fluid machine,
 b) obtaining a current fluid machine speed of each fluid machine,
 c) obtaining desired fluid flow rates in the fluid network system,
 d) determining a new fluid machine speed for each fluid machine based on the current fluid machine speeds and a change in the fluid machine speed required to obtain the desired fluid flow rates, wherein the change in the fluid machine speed is determined by minimizing a total fluid machine power which is a function dependent of the change in the fluid machine speed, the minimization being performed with constraints for fluid flow rate, fluid machine pressure and fluid machine speed, and
 e) controlling the speed of the plurality of fluid machines according to the new fluid machine speeds such that the minimum total fluid machine power in the fluid network system is attained.

By means of the present disclosure, control of fluid flow rates fulfilling the current fluid flow requirements in the fluid network system may be obtained with minimal total fluid machine power consumption.

One embodiment comprises a step f) of storing the new fluid machine speed of each fluid machine.

One embodiment comprises, prior to obtaining a respective current fluid flow rate, determining a model of the total fluid machine power by determining a relation between a change in fluid machine speed and a corresponding change in fluid machine power for each of the plurality of fluid machines empirically, wherein the relation forms part of the model and wherein the model is utilized for the minimization.

By empirically determining the relation between the change in fluid machine speed and the corresponding change in fluid flow rate for each fluid machine in an existing fluid network system simple network identification of the fluid network system can be obtained. This identification process can easily be repeated when the infrastructure of the fluid network system has been modified, e.g. expanded. The determined relation can be utilized to determine a total minimum electric power to be provided to the fluid machines in the fluid network system by means of optimization, while being able to provide a minimum required fluid flow in the fluid network system.

One embodiment comprises, prior to determining the relation, changing a fluid machine speed of each of the plurality of fluid machines.

One embodiment comprises applying an input signal pattern to the plurality of fluid machines to thereby change the fluid machine speed of the plurality of fluid machines, which input signal pattern is applied in such a way that the relation between the change in fluid machine speed and the corresponding change in fluid machine power can be determined for each fluid machine.

According to one embodiment the input signal pattern is such that it allows settling a fluid flow in the fluid network system, wherein the steps applied to the plurality of fluid machines are kept track of.

According to one embodiment the changing involves sequentially changing the fluid machine speed of each of the plurality of fluid machines.

According to one embodiment the sequential changing involves changing the fluid machine speed of each fluid machine such that only one fluid machine of the plurality of fluid machines is subject to a change in fluid machine speed at a time.

One embodiment comprises waiting between two subsequent fluid machine speed changes until a fluid flow in the fluid network system returns to an original state in which the fluid network system operated prior to the step of changing a fluid machine speed.

According to one embodiment the step of determining a model comprises determining a constant matrix defining the relation between the change in fluid machine speed and the corresponding change in fluid machine power.

According to one embodiment the fluid network system is a ventilation system of an underground mine and wherein the fluid machines are fans.

According to one embodiment the step of determining the model comprises determining a relation between the change in fluid machine speed and a corresponding change in fluid machine power for each of the plurality of fluid machines.

According to a second aspect of the present disclosure there is provided a computer program product comprising a computer readable medium on which computer code is stored, which computer code when executed performs the method according to the first aspect.

According to a third aspect of the present disclosure there is provided a control system for fluid flow control in a fluid network system comprising a plurality of fluid machines, which control system comprises: a processing system arranged to: obtain a respective current fluid flow rate associated with each fluid machine; obtain a current fluid machine speed of each fluid machine; obtain desired fluid flow rates in the fluid network system; determine a new fluid machine speed for each fluid machine based on the current fluid machine speeds and a change in the fluid machine speed required to obtain the desired fluid flow rates, wherein the change in the fluid machine speed is determined by minimizing a total fluid machine power which is a function dependent of the change in the fluid machine speed, the minimization being performed with constraints for fluid flow rate, fluid machine pressure and fluid machine speed; and control the speed of the plurality of fluid machines according to the new fluid machine speeds such that the minimum total fluid machine power in the fluid network system is attained.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION

In the following description, for purpose of explanation and not limitation, specific details are set forth, such as particular techniques and applications in order to provide a thorough understanding of the present disclosure. However, it will be apparent for a person skilled in the art that the present disclosure may be practiced in other embodiments that depart from these specific details. In other instances, detailed description of well-known methods and apparatuses are omitted so as not to obscure the description with unnecessary details.

The present disclosure may be utilized for fluid flow control in a fluid network system such as a ventilation system of an underground mine, a building ventilation system, district heating/cooling, a drainage system for e.g. underground mines and similar systems, as would be apparent to the person skilled in the art. For illustrative purposes only, the fluid network system will in the following be exemplified by a ventilation system of an underground mine. However, the methods and systems disclosed herein may equally well be implemented in other fluid network systems.

In general, the fluid flowing through the fluid network system may be a gas such as air, or a liquid such as water depending on the application.

Beneficially, the methods and control systems presented herein provides control of fluid machines in a fluid network system in such a way that the total power consumption of the fluid machines can be minimized while the provided fluid flow satisfies the minimum required fluid flow rate in the fluid network system.

Depending on the application, a fluid machine can be a fan or a pump. If the application concerns ventilation, the fluid machines are fans. If the application relates to fluid flow control of liquids, the fluid machines are pumps.

In the following disclosure, an example of an application of the claimed method will be given for an underground mine ventilation system. It is however to be noted, that the present methods and control systems can also be utilized in other fluid network systems, as previously mentioned. It is thus noted that the below explained method steps and control system which implements the method in a mine ventilation application can also be applied in a similar way in other applications concerning both gas and liquid flow control, wherein in the latter case the fans are exchanged for pumps.

Figure 1:
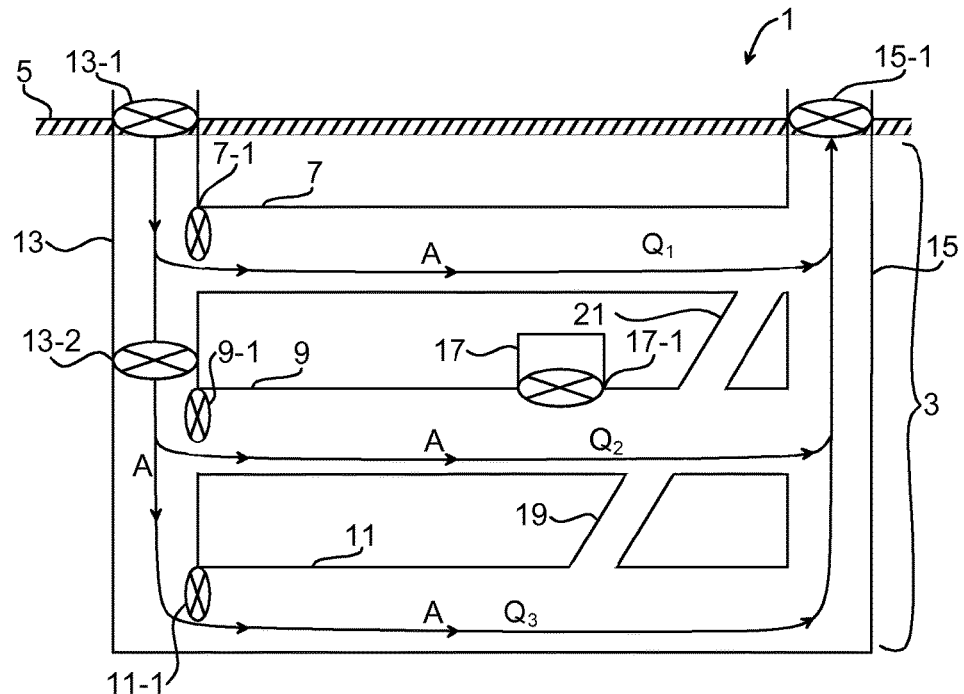
FIG. 1 schematically shows an example of a fluid network system.

FIG. 1 shows an example of an infrastructure of a fluid network system 1, i.e. a ventilation system of an underground mine. The fluid network system 1 has an underground infrastructure 3 below a ground surface 5. The fluid network system 1 comprises a plurality of shafts 7, 9 and 11. The shafts 7, 9, 11 define different shaft levels in the underground infrastructure 3. In the present case the first shaft 7 defines a first shaft level. The second shaft 9 defines a second shaft level. The third shaft 11 defines a third shaft level. In each shaft, a unique fluid flow rate requirement may be necessary, as exemplified by the different fluid flow rates $Q_1$, $Q_2$ and $Q_3$. The required fluid flow rate may for instance depend on mining vehicles present in a shaft.

The exemplified fluid network system 1 further comprises a downcast shaft 13 which extends from above the ground surface 5 and connects with shafts 7, 9 and 11 below the ground surface 5. The downcast shaft 13 has an intake fan 13-1 which provides air from the surface atmosphere to the underground infrastructure 3. The downcast shaft 13 optionally also has one or more pressure increasing fans 13-2 for increasing the air pressure deeper down in the underground infrastructure 3. The fluid network system 1 also has an air outtake shaft, i.e. an upcast shaft 15 which provides exhaust air to the surface atmosphere via an outtake fan 15-1. Hence, fresh air enters the fluid network system 1 via the intake fan 13-1 and downcast shaft 13, wherein the fresh air is distributed in the shafts 7, 9 and 11 according to airflow requirements, and exhaust air exits the fluid network system 1 via the upcast shaft 15 and outtake fan 15-1, as shown by arrows A.

The fluid network system 1 can optionally further comprise extraction zones, such as extraction zone 17 connected to the shaft 9, and ramps 19, 21. Mining can be performed in the extraction zone 17 and/or any of the shafts 7, 9, and 11. The ramps 19, 21 enable movement of equipment such as mining vehicles and the like from one level to another. In the exemplified fluid network system 1, ramp 19 connects the third shaft 11 with the second shaft 9. Ramp 21 connects the second shaft 9 with the first shaft 7.

Each shaft 7, 9, 11 is provided with a respective fan 7-1, 9-1 and 11-1. The fans 7-1, 9-1 and 11-1 provide fresh air from the downcast shaft 13 to their respective shaft 7, 9, 11. Furthermore, the extraction zone 17 is associated with a fan 17-1 which provides fresh air to the extraction zone 17 from shaft 9 to which the extraction zone 17 is connected.

There could of course be fewer or more shafts, upcast shafts, downcast shafts, extraction zones and fans in an underground mine in which ventilation control according to the present disclosure can be utilized; the fluid network system 1 is merely one example of a multitude of possible configurations/topologies.

Figure 2:
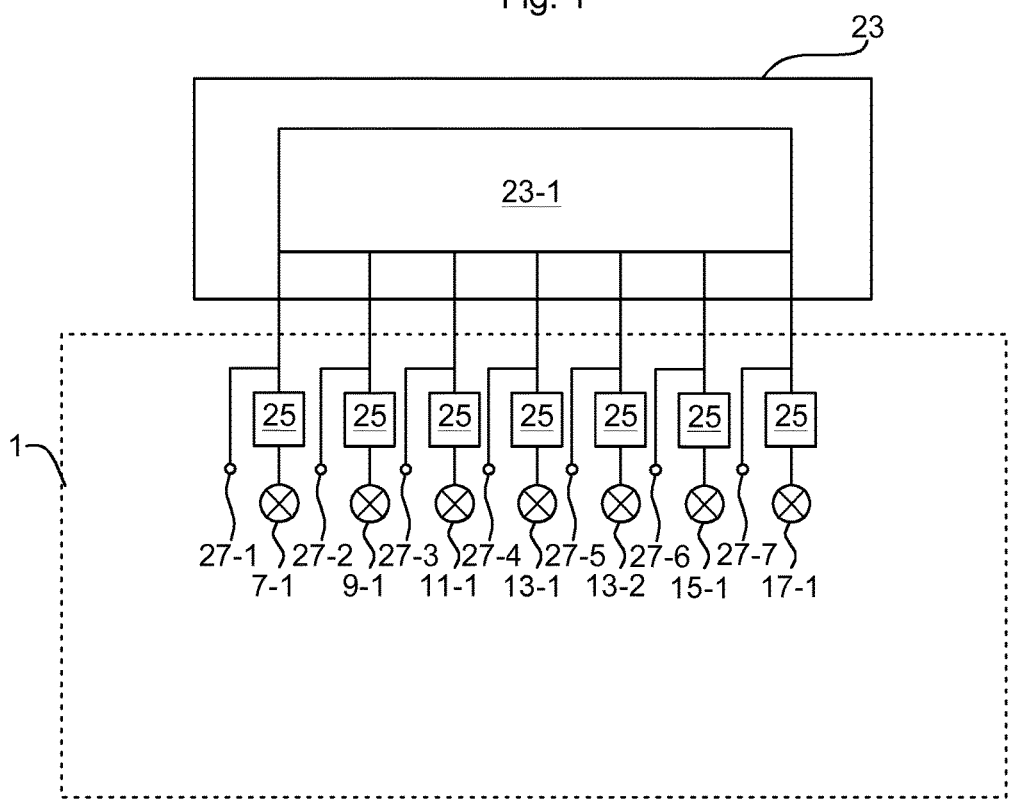
FIG. 2 is a schematic block diagram of a control system for a fluid network system.

FIG. 2 shows an example of a control system 23 for ventilation control in the fluid network system 1. The control system 23 comprises a processing system 23-1. When installed, the control system 23 is connected to the fluid network system which it is to control.

Control system 23 is an example of a control system arranged to determine network characteristics, i.e. to determine a model of a fluid network system such as fluid network system 1. Control system 23 is further arranged to control the fluid flow rate in the fluid network system based on the determined model.

Based on the determined network characteristics the control system 23 provides control of the rotational speed of the fans 7-1, 9-1, 11-1, 13-1, 13-2, 15-1 and 17-1 in the fluid network system 1 in such a way that the minimum fluid flow requirements in the shafts 7, 9, 11, and extraction zone 17 and hence in the fluid network system 1 are fulfilled while the fans 7-1, 9-1, 11-1, 13-1, 13-2, 15-1 and 17-1 consume a minimal amount of electric power, i.e. the total fluid machine power is minimized.

The processing system 23-1 may be an integrated system comprising a single processor for the control of all fans of the fluid network system. Alternatively, the processing system may form a distributed system with an individual processor for each fan. The processing system 23-1 is preferably implemented in software. The control system 23 may be a hardware device which allows user interaction between e.g. an operator or engineer and the fluid network system.

The control system 23 operates fans 7-1, 9-1, 11-1, 13-1, 13-2, 15-1 and 17-1 via a respective motor 25. Each motor 25 is adapted to drive the rotor or rotors of its associated fan. Each fan 7-1, 9-1, 11-1, 13-1, 13-2, 15-1 and 17-1 is associated with a respective sensor 27-1, 27-2, 27-3, 27-4, 27-5, 27-6 and 27-7. Each sensor is arranged to measure a fluid flow rate and/or fluid flow rate change in a fluid flow channel, e.g. shaft, in which the corresponding fan is arranged. For instance, sensor 27-1 is arranged to measure the fluid flow rate in a fluid flow channel in which fan 7-1 is arranged, i.e. in shaft 7. The remaining sensor/fan pairs are arranged similarly.

An alternative way to determine the fluid flow rate change is to measure the differential pressure over each fan by means of a respective sensor and utilize the fan characteristics of the fans to estimate the fluid flow rate changes. The fan characteristics are preferably loaded into the processing system for this purpose.

Each fan 7-1, 9-1, 11-1, 13-1, 13-2, 15-1 and 17-1 is via a respective motor 25 arranged in communication with the control system 23, and in particular with the processing system 23-1. Thereby, the control system 23 can provide control instructions to the fans 7-1, 9-1, 11-1, 13-1, 13-2, 15-1 and 17-1 regarding the rotational speed of each fan of the fluid network system 1. Communication between the control system 23 and the fans 7-1, 9-1, 11-1, 13-1, 13-2, 15-1 and 17-1 can either be via wires, or be wireless.

Figure 3:
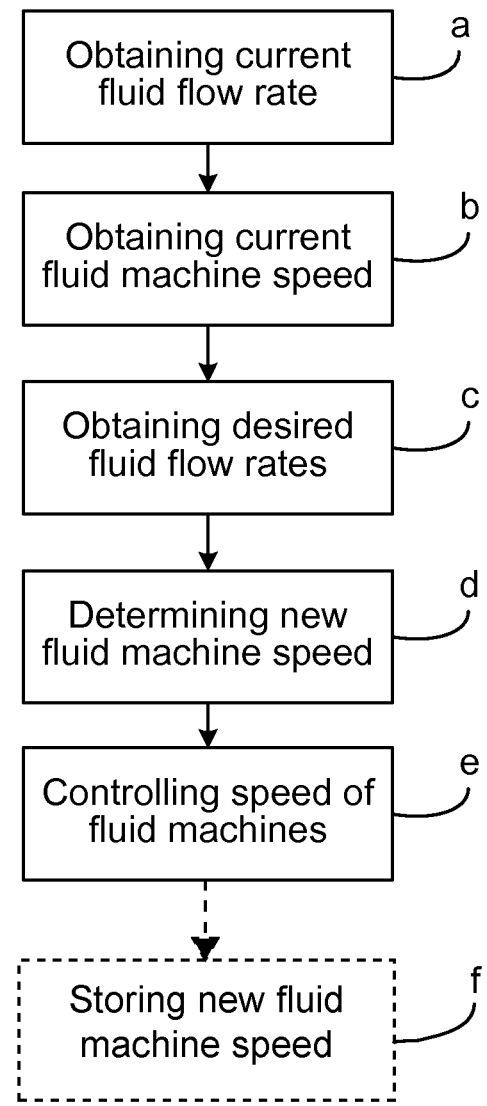
FIG. 3 depicts a flowchart of a method of controlling ventilation in a fluid network system.

With reference to FIG. 3, fluid flow control in a general fluid network will now shortly to be described.

In a step a) a respective current fluid flow rate associated with each fluid machine is obtained by a processing system such as processing system 23-1. The current fluid flow rate can for example be obtained via a respective sensor arranged to measure the fluid flow rate, for example by means of sensor 27-1, 27-2, 27-3, 27-4, 27-5, 27-6 and 27-7, or by means of differential pressure measurements over each fan in combination with the utilization of fan characteristics which according to one variation may be loaded into a memory of the control system.

In a step b) the current fluid machine speed of each fluid machine is obtained by the processing system. The current fluid machine speed of each fluid machine may for example be obtained from storage in a memory of the control system. The current fluid machine speed for each fluid machine may for example have been stored in the memory in a previous iteration of the method.

Optionally, according to one variation of the method, for example in case the fluid machines are fans, opening angles of the air regulators of the fans is also obtained.

In a step c) the desired fluid flow rates in the fluid network system are obtained by the processing system. The desired fluid flow rates can for example be based on a planned activity in a certain part of the fluid network system, or activity having ceased in a part of the fluid network system.

In a step d) a new fluid machine speed for each fluid machine is determined by the processing system. The new fluid machine speed is based on the current fluid machine speeds obtained in step b) and on a change in the fluid machine speed required to obtain the desired fluid flow rates. In particular, the new fluid machine speed for each fluid machine may be the sum of the current fluid flow machine speed and the change in the fluid machine speed. The change in the fluid machine speed required to obtain the desired fluid flow rates is determined by minimizing a total fluid machine power $\Delta E$, i.e. a cost function, dependent of the change in the fluid machine speed, as shown in equation (1) below.

$$\Delta E = H_e \Delta \beta^2 \quad (1)$$

Equation (1) is a model of the total fluid machine power. $H_e$ is a constant matrix that has previously been determined in an empirical manner, for example during commissioning. The determination of the constant matrix $H_e$ will be described in more detail with reference to FIGS. 4 and 5. $\Delta \beta$ is a vector containing the change in fluid machine speed for all fluid machines. In variations in which the opening angles are obtained, these can also be contained in the $\Delta \beta$ vector.

The minimization of the total fluid machine power $\Delta E$ is performed with constraints for fluid flow rate, fluid machine pressure and fluid machine speed. The constraints include expressions comprising similar constant matrices as $H_e$. The determination of these matrices will be elaborated on in what follows.

That the total fluid machine power is dependent of the change in the fluid machine speed is to be understood to mean that the total fluid machine power $\Delta E$ is a function of the change in the fluid machine speed.

In case the opening angles have been obtained in step b) the change in opening angles is also determined in step d) from the minimization of the total fluid machine power, i.e. from the minimization of equation (1).

In a step e) the speed of the plurality of fluid machines are controlled according to the new fluid machine speeds such that the minimum total fluid machine power in the fluid network system is attained. Hereto, the processing system provides control signals to the motors/frequency converters or other actuators associated with the fluid machines to control the fluid machines optimally based on the new fluid machine speeds that have been determined. In case the opening angles have been determined, the opening angles are also controlled in step e).

In a step f) the new fluid machine speed of each fluid machine is stored by the control system. The new fluid machine speed can thereby be obtained from the memory in the next iteration of the method, in which case the new fluid machine speed is termed "current fluid machine speed".

It should be noted that the above steps a) to e) need not necessarily be carried out in the order presented above; the desired fluid flow rates may for example be obtained prior to obtaining the current flow rate, and/or prior to obtaining the current fluid flow machine speed of each fluid machine.

Figure 4:
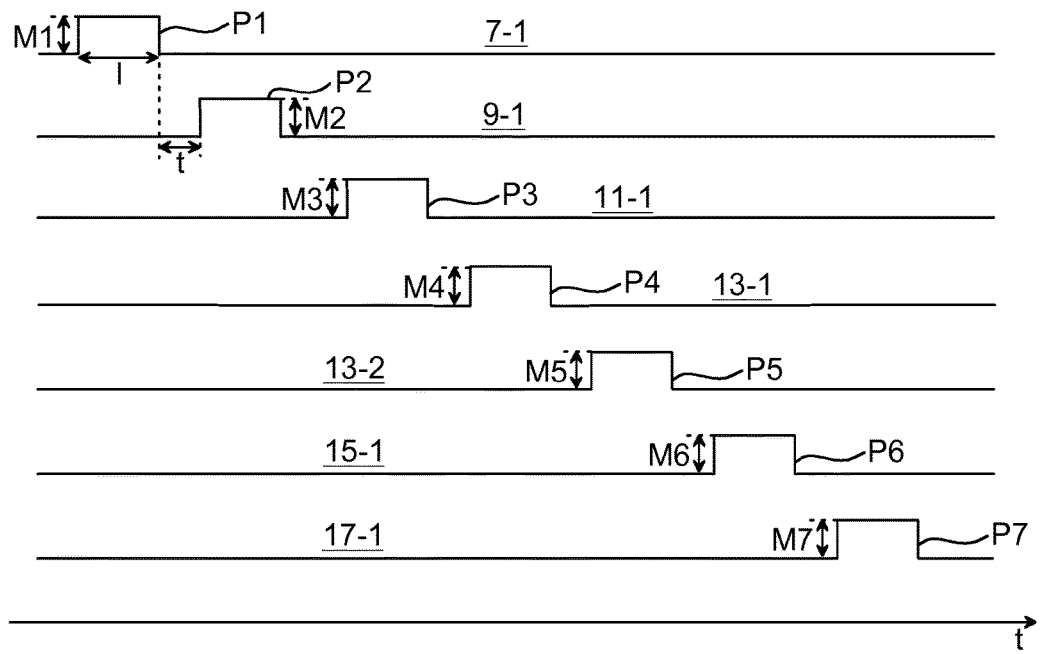
FIG. 4 is a diagram showing sequential speed change of the fans in the fluid network system in FIG. 1.
Figure 5:
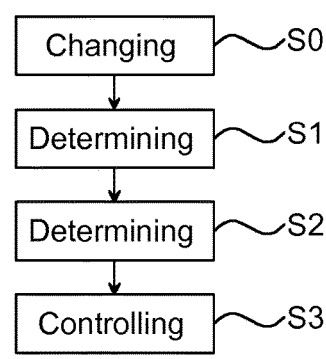
FIG. 5 is a flowchart of a method of identifying fluid characteristics in a fluid network system.

With reference to FIGS. 4 and 5, the model identification procedure will now be described in more detail. It should here be understood that the steps carried out in the method described in FIG. 5 are generally carried out prior to the steps a)-e) of the method of FIG. 3 are carried out for the first time, e.g. during commissioning of the fluid network system. The steps of the identification procedure can however additionally be performed also after steps a)-e) have been carried out for example in case the topology of the fluid network system is altered and a new model corresponding to the new fluid network system layout is to be identified.

When there is a need to identify network characteristics of a fluid network system in which the control system 23 is arranged, such as during commissioning of the fluid network system, the control system 23 provides control signals to each of the fans 7-1, 9-1, 11-1, 13-1, 13-2, 15-1 and 17-1 in a first step S0, as shown in FIG. 5. The control signals contain instructions that each fan is to change its rotational speed. The instructions are preferably provided in a sequential manner with one fan at a time changing its speed.

The change of speed of each fan can be provided by input signal patterns from the control system 23. Such speed change can for instance be achieved by means of frequency converters for providing speed change steps to a respective motor and corresponding fan, or via voltage or current step functions from the respective motor 25 when the motor 25 has received instructions from the control system 23. Steps or step functions may be positive or negative. A step or step function may provide an increase or alternatively a decrease in a fan speed. Other motor signals than steps or step functions are also possible for changing the speed of the fans.

When a motor provides a step to a fan, the change in fluid flow rate, pressure or fluid machine power associated with that fan is measured. Thus, for instance when the fan speed of fan 7-1 is changed by means of its motor 25, the corresponding change in fluid flow rate is measured by means of sensor 27-1 which is associated with fan 7-1.

The change in speed of the fans 7-1, 9-1, 11-1, 13-1, 13-2, 15-1 and 17-2 is in one embodiment made in a sequential manner, as shown in FIG. 4. Each fan 7-1, 9-1, 11-1, 13-1, 13-2, 15-1 and 17-2 is sequentially provided with a respective step or pulse P1, P2, P3, P4, P5, P6 and P7.

For the purposes of determining network characteristics, e.g. determining a relation between the change in fan speed and corresponding change in fluid flow rate, the magnitude M1-M7 of the steps is not a matter of importance. It is sufficient to provide steps having a magnitude which provides a measurable fluid flow rate change. Moreover, each step may have independently determined magnitude. Thus each step magnitude may differ from the magnitude of the other steps. Alternatively, the magnitude of each step P1-P7 can be essentially the same.

The duration 1 of each step should be sufficiently long for the affected fan to attain steady state operation, i.e. a state where the said fan has obtained the speed corresponding to the step applied to the fan by the motor.

Furthermore, the time t between successive steps should be sufficiently long such that a normal operational state i.e. a steady state in which the fluid network system 1 operated prior to changing any fan speed, can be obtained. Hence, the control system 23 waits sufficiently long between each consecutive step P1-P2, P2-P3, P3-P4, P4-P5, P5-P6 and P6-P7 with the provision of control signals to the motors 25 such that a normal state can be obtained between each step P1-P7.

By changing the fan speeds of each of the plurality of fans one at a time, a relation between the control parameter $\Delta B$ related to the fan speed change and the change in any of fluid flow rate $\Delta Q_k$, change in pressure $\Delta p_k$ over each fluid machine, and change in fluid machine power $\Delta E_k$ for each fluid machine can be determined in a step S1.

Alternatively and preferably, the relation between the control parameter $\Delta B$ related to the fan speed change and the change in fluid flow rate $\Delta Q$ can be determined by changing the speed of the plurality of fans by providing input signals to the motors and hence the fans in according to any pattern in such a way that each step, i.e. each speed change of a fan, is allowed to settle the fluid flow in the fluid network system while keeping track of the steps applied to the plurality of fans.

To that end, when each fan in the fluid network system has been subjected to a speed change, equation (2) below can be solved because the vectors $\Delta B$ and $\Delta Q$ are known.

$$\Delta Q = H_q \Delta B \tag{2}$$

$\Delta B$ is the control parameter contained in the control signals provided by the control system 23 to the fans 7-1, 9-1, 11-1, 13-1, 13-2, 15-1 and 17-2 via the motors 25. The $\Delta Q$ vector comprises the fluid flow rate changes measured by all the sensors 27-1, 27-2, 27-3, 27-4, 27-5, 27-6 and 27-7. In particular a constant matrix $H_q$ which approximates the relation between the fan speed changes and the corresponding fluid flow rate changes can be determined. The matrix $H_q$ may for instance be determined by means of a least squares method. The matrix $H_q$ is utilized in an expression used for the fluid flow constraint when minimizing the total fluid machine power $\Delta E$ in equation (1).

$H_e$ is determined in a similar manner as $H_q$. When a motor provides a step to a fan, the change in power associated with that fan is measured. Thus, for instance when the fan speed of fan 7-1 is changed by means of its motor 25, the corresponding change in power is measured by means of sensor 27-1 which is associated with fan 7-1.

Additionally, a matrix $H_p$ is determined in a similar manner as $H_q$ and $H_e$. $H_p$ is defined by the relation $$\Delta(\Delta p) = H_p \Delta B \tag{3}$$

As noted above, $\Delta p$ is a vector of changes in pressure over a fluid machine, e.g. a fan. Thus, when a motor provides a step to a fan, the change in pressure of that fan is measured. Thus, for instance when the fan speed of fan 7-1 is changed by means of its motor 25, the corresponding change in pressure is measured by means of sensor 27-1 which is associated with fan 7-1. The matrix $H_p$ is utilized in an expression used for the fluid machine pressure constraint when minimizing the total fluid machine power ΔE in equation (1).

It should be noted that the determination of $H_e$ and $H_p$ can be performed in the same manner as discussed in more detail above in connection with elaborations of the determination of $H_q$, i.e. by providing steps to each fan, for example sequentially or by providing input signals to the motors and hence the fans in according to any pattern in such a way that each step, i.e. each speed change of a fan, is allowed to settle the fluid flow in the fluid network system while keeping track of the steps applied to the plurality of fans.

When the relation between the fluid flow rate change and change in fluid machine speed, the relation between the fluid machine power change and change in fluid machine speed, and the relation between the change in pressure over the fluid machines and the fluid machine speed have been determined, i.e. when the matrices H.sub.q, H.sub.e, and H.sub.p has been determined (step S2), the fluid machines can be controlled (step S3) optimally with regards to total fluid machine power consumption, as has been described above with reference to FIG. 3.

The present disclosure hence provides a simple way to determine network characteristics of a fluid network system by empirically determining relations between changes in fluid machine speed and corresponding changes in fluid flow rate, fluid machine pressure and fluid machine power. Beneficially, these relations can be used to minimize the total power to be used by fluid machines in a fluid network system and to control the fluid machines based on the minimization. Thereby electricity can be saved and a reduced environmental footprint can be provided. Furthermore, lower energy consumption also result in lower costs for fluid network system operators.

The skilled person in the art realizes that the present disclosure by no means is limited to the examples described hereabove. On the contrary, many modifications and variations are possible within the scope of the appended claims.

the invention claimed is:

1. A method of controlling fluid flow in a fluid network system by means of a plurality of fluid machines the method comprising:
a) obtaining a respective current fluid flow rate associated with each fluid machine via a respective sensor,
b) obtaining a current fluid machine speed of each fluid machine, the current fluid machine speed being a condition of the respective fluid machine in operation,
c) obtaining desired fluid flow rates in the fluid network system,
d) determining a new fluid machine speed for each fluid machine based on the current fluid machine speed of the respective fluid machine and a change in fluid machine speed of the respective fluid machine required to obtain the desired fluid flow rates, wherein the change in fluid machine speed is determined by minimizing a total fluid machine power by utilizing a total fluid machine power model defined by $\Delta E = H_e \Delta \beta^2$ where $H_e$ is a constant matrix and $\Delta \beta$ is a vector containing the change in fluid machine speed for all fluid machines, the minimization being performed with constraints for fluid flow rate, fluid machine differential pressure, and fluid machine speed associated with the respective fluid machine, the fluid machine differential pressure being a differential pressure over the respective fluid machine,
e) controlling the speed of the plurality of fluid machines according to the new fluid machine speeds such that the minimum total fluid machine power in the fluid network system is attained, and prior to obtaining the respective current fluid flow rate associated with each fluid machine, empirically determining the total fluid machine power model by determining a relation between a change in fluid machine speed and a corresponding change in fluid machine power for each of the plurality of fluid machines, wherein the relation forms part of the model, and wherein determining the total fluid power model further comprises determining the constant matrix by changing the fluid machine speed of the plurality of fluid machines by applying input signals to motors of the fluid machines, according to a pattern that allows the fluid flow in the fluid network system to settle to a steady state after the change in fluid machine speed of a given fluid machine of the plurality of fluid machines has been made, and wherein the constant matrix defines a relation between a control parameter related to the change in fluid machine speed and the change in fluid flow obtained by the sensors.

2. The method as claimed in claim 1, comprising a step f) of storing the new fluid machine speed of each fluid machine.

3. The method as claimed in claim 1, comprising, prior to determining the relation, changing a fluid machine speed of each of the plurality of fluid machines.

4. The method as claimed in claim 3, wherein the input signals are applied according to the pattern in such a way that the relation between the change in fluid machine speed and the corresponding change in fluid machine power can be determined for each fluid machine.

5. The method as claimed in claim 4, wherein the changes in fluid machine speed applied to the plurality of fluid machines are kept track of.

6. The method as claimed in claim 3, wherein the changing involves sequentially changing the fluid machine speed of each of the plurality of fluid machines.

7. The method as claimed in claim 6, wherein the sequential changing involves changing the fluid machine speed of each fluid machine such that only one fluid of the plurality of fluid machines is subject to a change in fluid machine speed at a time.

8. The method as claimed in claim 6, comprising waiting between two subsequent fluid machine speed changes until a fluid flow in the fluid network system returns to an original state in which the fluid network system operated prior to the step of changing a fluid machine speed.

9. The method as claimed in claim 1, wherein the fluid network system is a ventilation system of an underground mine and wherein the fluid machines are fans.

10. The method as claimed in claim 1, wherein the desired flow rates are based on a start or end of a planned activity in a part of the fluid network system.

11. A computer program product comprising a non-transitory computer readable medium on which computer code is stored, the computer code when executed performs the method as claimed in claim 1.

12. A control system for fluid flow control in a fluid network system having a plurality of fluid machines, the control system comprising:
a processing system configured to:
obtain a respective current fluid flow rate associated with each fluid machine via a respective sensor,
obtain a current fluid machine speed of each fluid machine, the current fluid machine speed being a condition of the respective fluid machine in operation,
obtain desired fluid flow rates in the fluid network system, determine a new fluid machine speed for each fluid machine based on the current fluid machine speed of the respective fluid machine and a change in fluid machine speed of the respective fluid machine required to obtain the desired fluid flow rates, wherein the change in fluid machine speed is determined by minimizing a total fluid machine power by utilizing a total fluid machine power model defined by $\Delta E = H_e \Delta \beta^2$ where $H_e$ is a constant matrix and $\Delta \beta$ is a vector containing the change in fluid machine speed for all fluid machines, the minimization being performed with constraints for fluid flow rate, fluid machine differential pressure, and fluid machine speed associated with the respective fluid machine, the fluid machine differential pressure being a differential pressure over the respective fluid machine, and control the speed of the plurality of fluid machines according to the new fluid machine speeds such that the minimum total fluid machine power in the fluid network system is attained, wherein prior to obtaining the respective current fluid flow rate associated with each fluid machine, the control system is configured to empirically determine the total fluid machine power model by determining a relation between a change in fluid machine speed and a corresponding change in fluid machine power for each of the plurality of fluid machines, wherein the relation forms part of the model, and wherein determining the total fluid power model further comprises determining the constant matrix by changing the fluid machine speed of the plurality of fluid machines by applying input signals to motors of the fluid machines, according to a pattern that allows the fluid flow in the fluid network system to settle to a steady state after the change in fluid machine speed of a given fluid machine of the plurality of fluid machines has been made, and wherein the constant matrix defines a relation between a control parameter related to the change in fluid machine speed and the change in fluid flow obtained by the sensors.

13. The control system as claimed in claim 12, wherein the desired flow rates are based on a start or end of a planned activity in a part of the fluid network system.

* * * * *